(12) United States Patent
Jeong (10) Patent No.: US 11,594,021 B1
(45) Date of Patent: Feb. 28, 2023

(54) METHOD AND SYSTEM FOR MAINTAINING TUNNEL USING TUNNEL IMAGE DATA

(71) Applicant: Rainbowtech Co., Ltd., Seongnam-si (KR)

(72) Inventor: Han Kyu Jeong, Seongnam-si (KR)

(73) Assignee: Rainbowtech Co., Ltd., Seongnam-si (KR)

( * ) Notice: Subject to any disclaimer, the term of this patent is extended or adjusted under 35 U.S.C. 154(b) by 0 days.

(21) Appl. No.: 17/896,699

(22) Filed: Aug. 26, 2022

(30) Foreign Application Priority Data

Oct. 18, 2021 (KR) ........................ 10-2021-0138296

(51) Int. Cl.
*G06V 20/17* (2022.01)
*G06V 10/764* (2022.01)
*G06V 20/10* (2022.01)

(52) U.S. Cl.
CPC ............ *G06V 20/17* (2022.01); *G06V 10/764* (2022.01); *G06V 20/176* (2022.01)

(58) Field of Classification Search
CPC ..... G06V 20/17; G06V 20/176; G06V 10/764
See application file for complete search history.

(56) References Cited

U.S. PATENT DOCUMENTS

| | | | | |
|---|---|---|---|---|
| 10,173,773 | B1 * | 1/2019 | Flick | G08G 5/0086 |
| 11,410,420 | B1 * | 8/2022 | Roy | G06V 20/13 |
| 2015/0009331 | A1 * | 1/2015 | Venkatraman | B61L 27/53 |
| | | | | 348/148 |
| 2020/0103552 | A1 * | 4/2020 | Phelan | G01W 1/06 |

(Continued)

FOREIGN PATENT DOCUMENTS

| | | |
|---|---|---|
| JP | 2010-055250 A1 | 3/2010 |
| KR | 10-2017-0060973 A | 6/2017 |
| KR | 10-1914614 B | 11/2018 |

(Continued)

OTHER PUBLICATIONS

Li, Dawei, et al. "Automatic defect detection of metro tunnel surfaces using a vision-based inspection system." Advanced Engineering Informatics 47 (2021): 101206. (Year: 2021).*

(Continued)

*Primary Examiner* — Utpal D Shah (74) *Attorney, Agent, or Firm* — Studebaker & Brackett PC (57) ABSTRACT

Provided are a method and a system for analyzing image data obtained by photographing a tunnel by a drone using artificial intelligence, in tunnel maintenance inspection, rapidly and accurately finding a part that requires maintenance of the tunnel, and calculating a maintenance solution and a maintenance estimate for the part. The system for maintaining a tunnel by analyzing tunnel image data received from a drone using artificial intelligence, includes: the drone that photographs a tunnel to generate the tunnel image data; a position signal generating apparatus that is provided inside the tunnel and generates a position signal for determining position information of the drone in the tunnel; and an artificial intelligence tunnel maintenance apparatus that finds a part of the tunnel that requires maintenance, and calculates an optimal maintenance solution and an optimal maintenance estimate necessary for the tunnel maintenance.

12 Claims, 6 Drawing Sheets

(56) References Cited

U.S. PATENT DOCUMENTS

2020/0175352 A1* 6/2020 Cha .................. G06N 3/04
2022/0101507 A1* 3/2022 Tournier ............. G06V 20/52

FOREIGN PATENT DOCUMENTS

| KR | 10-2091165 B | 3/2020 |
| KR | 10-2105568 B | 4/2020 |
| KR | 10-2237096 B | 4/2021 |
| KR | 10-2299295 B1 | 9/2021 |
| WO | WO-2021224893 A1 * | 11/2021 |

OTHER PUBLICATIONS

Tran, Viet Vu. Underground inspection drone-case study in Barcelona sewage system. MS thesis. Universitat Politècnica de Catalunya, 2018. (Year: 2018).*

Chataigner, François, et al. "Arsi: an aerial robot for sewer inspection." Advances in Robotics Research: From Lab to Market. Springer, Cham, 2020. 249-274. (Year: 2020).*

An Office Action mailed by Korean Intellectual Property Office dated Jan. 17, 2022, which corresponds to Korean Patent Application No. 10-2021-0138296; with English language translation.

* cited by examiner

| DIVISION | ENVIRONMENT | DURABILITY | | | WATERPROOFING (UNIT: mm) |
|---|---|---|---|---|---|
| | OTHER CAUSE | SEVERE ENVIRONMENT | MEDIUM ENVIRONMENT | ORDINARY ENVIRONMENT | |
| WIDTH OF CRACK REQUIRING MAINTENANCE | LARGE | 0.4 OR MORE | 0.4 OR MORE | 0.6 OR MORE | 0.2 OR MORE |
| | MEDIUM | 0.4 OR MORE | 0.6 OR MORE | 0.8 OR MORE | 0.2 OR MORE |
| | SMALL | 0.6 OR MORE | 0.8 OR MORE | 1.0 OR MORE | 0.2 OR MORE |
| WIDTH OF CRACK NOT REQUIRING MAINTENANCE | LARGE | 0.1 OR LESS | 0.2 OR LESS | 0.2 OR LESS | 0.05 OR LESS |
| | MEDIUM | 0.1 OR LESS | 0.2 OR LESS | 0.3 OR LESS | 0.05 OR LESS |
| | SMALL | 0.2 OR LESS | 0.3 OR LESS | 0.3 OR LESS | 0.05 OR LESS |

FIG 6

| CONDITIONS | ALLOWABLE MAXIMUM CRACK WIDTH (mm) |
|---|---|
| DRY AIR LAYER OR PROTECTING/CURING LAYER | 0.4 |
| INSIDE HUMID AIR, INSIDE SOIL | 0.3 |
| CONTACT WITH CRYOPROTECTANT | 0.175 |
| REPEATED DRY AND WET CONDITIONS CAUSED BY SEAWATER AND SEA WIND | 0.15 |
| WATERTIGHT STRUCTURAL MEMBER | 0.1 |

METHOD AND SYSTEM FOR MAINTAINING TUNNEL USING TUNNEL IMAGE DATA

CROSS-REFERENCE TO RELATED APPLICATION

A claim for priority under 35 U.S.C. § 119 is made to Korean Patent Application No. 10-2021-0138296 filed on Oct. 18, 2021 in the Korean Intellectual Property Office, the entire contents of which are hereby incorporated by reference.

BACKGROUND

Techinical Field

The present invention relates to a method and a system for maintaining a tunnel using tunnel image data, and more particularly to, a method and a system for analyzing image data obtained by photographing a tunnel by a drone using artificial intelligence, finding a part that requires maintenance of the tunnel in a short time, and calculating a maintenance solution and a maintenance estimate for the part.

Related Art

[National R&D Project for the present invention]
[Project number ] D2121026
[Department] Gyeonggi-do
[Research Management Institution] Gyeonggi-do Business & Science Accelerator
[Project name] Gyeonggi-do technology development project
[Research title] Development of deep learning AI system for building exterior diagnosis that automatically recommends crack repair and painting construction methods through drone photographing
[Contribution rate] 100/100
[Organizer] Rainbowtech Co., Ltd.
[Research Period] 2021.08.01~2022.07.31

A lot of buildings constructed in the era of industrialization have become old and aged as a lot of time has passed, and accordingly, the need for maintenance of the buildings has increased.

A safety inspection for maintenance of such old buildings has been mainly performed by visually checking cracks on an external appearance of the buildings by humans, but there are many dangerous factors such as fall death during the maintenance of the buildings.

Further, an inspection result of maintenance may vary depending on a skill level of an operator or inspector. Accordingly, there is an increasing demand for a standard inspection method, a cost estimation method, and a system thereof for making an accurate inspection in the maintenance inspection related to the external appearance of the buildings.

Prior Art Literature

[Patent document]
Korea Patent No. 10-1914614 (2018.11.02)
Korea Patent No. 10-2237096 (2021.04.08)

SUMMARY

An object of the present invention is to provide a method and a system for analyzing image data obtained by photographing a tunnel by a drone using artificial intelligence, in tunnel maintenance inspection, rapidly and accurately finding a part that requires maintenance of the tunnel, and calculating a maintenance solution and a maintenance estimate for the part.

According to an aspect of the present invention, there is provided a system for maintaining a tunnel by analyzing tunnel image data received from a drone using artificial intelligence, including: the drone that photographs a tunnel to generate the tunnel image data; a position signal generating apparatus that is provided inside the tunnel and generates a position signal for determining position information of the drone in the tunnel; and an artificial intelligence tunnel maintenance apparatus that finds a part of the tunnel that requires maintenance, and calculates an optimal maintenance solution and an optimal maintenance estimate necessary for the tunnel maintenance.

Here, the artificial intelligence tunnel maintenance apparatus may include: a communicating unit that communicates with the drone to receive the tunnel image data and transmits a drone control signal; a DB that stores tunnel data and the tunnel image data; a primary tunnel image data generating unit that controls the drone under the control of an artificial intelligence processing unit to perform drone photographing to generate primary tunnel image data for a concerned area of the tunnel; and the artificial intelligence processing unit that analyzes the tunnel data and the tunnel image data through big data and artificial intelligence to divide the tunnel into drone photographing areas, analyzes the primary tunnel image data to select a dangerous part that requires intensive photographing for the tunnel maintenance, performs precise drone photographing for the dangerous part to generate secondary tunnel image data including corrected features for cracks, and analyzes the secondary tunnel image data to calculate a maintenance solution and a maintenance estimate for the tunnel.

Here, the artificial intelligence processing unit may include: a drone photographing area dividing unit that determines structural features of the tunnel using at least one of the tunnel data and the tunnel image data to divide the tunnel into the drone photographing areas according to priority; a dangerous part selecting unit that analyzes the primary tunnel image data through a dangerous part selecting artificial intelligence method to select the dangerous part that requires the intensive photographing for the tunnel maintenance; a secondary tunnel image data generating unit that performs the precise drone photographing for the dangerous part through a precise crack photographing artificial intelligence method to generate the secondary tunnel image data including the corrected features for the cracks; and a maintenance solution and estimate calculating unit that analyzes the secondary tunnel image data using a tunnel maintenance artificial intelligence method to calculate the maintenance solution and the maintenance estimate for the dangerous part.

Here, the drone may include: a position determining unit that receives the position signal from the position signal generating apparatus and determines a position in the tunnel through the position signal; an image capturing unit that is provided with at least one of an image capturing apparatus including lighting and an ultrasonic apparatus, and acquires tunnel image data for an inner surface of the tunnel; and a drone communicating unit that communicates with the artificial intelligence maintenance apparatus.

Here, the system may further include a raw material information processing unit. The raw material information processing unit controls the communicating unit to communicate with each supplier server with respect to raw material information, periodically receives the raw material information through the Internet, updates and stores the received raw material information in the DB, and searches for the raw material information when necessary, and the maintenance solution and estimate calculating unit calculates a tunnel maintenance solution and a maintenance estimate for maximizing a maintenance effect using the raw material information acquired from the raw material information processing unit.

Here, the drone photographing area dividing unit may set a maintenance importance in consideration of a tunnel type, a tunnel construction method, tunnel design drawings, and natural environments in which the tunnel is located, and divide the tunnel into the drone photographing areas according to the maintenance importance.

Here, the dangerous part selecting unit may analyze at least one of a photographing route of the drone and photographing information included in the primary tunnel image data stored in the DB, perform drone photographing to match the photographing route of the drone, performs correction to be the same or similar to the photographing information to generate the primary tunnel image data, and select a part of the tunnel in which a change of at least one of the shape, color, and features of cracks in the primary tunnel image data is equal to or greater than a reference range as a dangerous part, using a CNN (Convolution Neural Network) method for optimally changing a filter and a channel according to features to be compared between the generated primary tunnel image data and the existing tunnel image data.

According to another aspect of the present invention, there is provided a tunnel maintaining method using tunnel image data in a tunnel maintaining system including a drone and an artificial intelligence tunnel maintenance apparatus, the method including: (a) a step of performing a setting for determining the position of the drone inside the tunnel using a position signal of the position signal generating apparatus, by the tunnel artificial intelligence maintenance apparatus; (b) a step of dividing a tunnel into drone photographing areas using at least one of the position signal of the position signal generating apparatus, tunnel data stored in a DB, and existing bridge image data, by the artificial intelligence tunnel maintenance apparatus; (c) a step of performing drone photographing for the photographing areas of the drone according to priority, generating primary tunnel image data for a concerned area including a photographing route of the drone and photographing information, and storing the generated primary tunnel image data in the DB to update the existing tunnel image data, by the artificial intelligence tunnel maintenance apparatus; (d) a step of analyzing the primary tunnel image data using a dangerous part selecting artificial intelligence method to select a dangerous part that needs intensive photographing for tunnel maintenance, by the artificial intelligence tunnel maintenance apparatus; (e) a step of performing precise drone photographing for the dangerous part using a precise crack photographing artificial intelligence method, generating secondary tunnel image data including corrected features for cracks, and storing the generated secondary tunnel image data in the DB, by the artificial intelligence tunnel maintenance apparatus; and (f) a step of analyzing the secondary tunnel image data using a tunnel maintenance artificial intelligence method to calculate a maintenance solution and a maintenance estimate for the tunnel, by the artificial intelligence tunnel maintenance apparatus.

Here, the step (b) may include a step of determining the position of the drone in the tunnel using the position signal of the position signal generating apparatus, setting a maintenance importance in consideration of the tunnel data and natural environment conditions in which the tunnel is built, and dividing the tunnel into the drone photographing areas according to the maintenance importance.

Here, the photographing route of the drone may include at least one of position information according to movement of the drone for generating the primary tunnel image data, information on position changes of the drone by lapse of time, and speed information of the drone, the photographing information may include at least one of information on a time, a date, a wind speed and brightness in the tunnel when the primary tunnel image data is generated, and information on a distance between the drone and a concerned part of the tunnel when the primary tunnel image data is generated. The dangerous part selecting artificial intelligence method may analyze at least one of the photographing route of the drone and the photographing information included in the primary tunnel image data stored in the DB, perform drone photographing to match the photographing route of the drone, perform correction to be the same or similar to the photographing information to generate the primary tunnel image data, and select a part of the tunnel in which a change of at least one of the shape, color, and features of cracks in the primary tunnel image data is equal to or greater than a reference range as a dangerous part, using a CNN (Convolution Neural Network) method for optimally changing a filter and a channel according to features to be compared between the generated primary tunnel image data and the existing tunnel image data.

Here, the precise crack photographing artificial intelligence method may determine the width, length, and depth of a crack by correcting the photographing route, a photographing position, and a photographing distance of the drone.

Here, the tunnel maintenance artificial intelligence method may determine an optimal maintenance solution by analyzing a tunnel design, a construction method, construction materials, features of cracks of a part where the cracks occur, and a use situation of the tunnel, in the secondary tunnel image data, and calculate an optimal maintenance estimate using the same. Here, the tunnel maintenance artificial intelligence method may calculate a tunnel maintenance solution and a maintenance estimate for optimizing a cost and a maintenance effect necessary for the tunnel maintenance using raw material information necessary for the tunnel maintenance, acquired through a raw material information processing unit.

According to the present invention, it is possible to quickly and accurately provide a maintenance solution and a maintenance estimate by analyzing drone image data of a tunnel using big data and artificial intelligence.

Further, according to the present invention, by analyzing cracks in the tunnel using artificial intelligence to determine priority for maintenance according to parts where cracks occur and features of the cracks, it is possible to efficiently calculate the maintenance solution and the cost of maintenance of the tunnel.

DETAILED DESCRIPTION

Advantages and features of the present invention, and methods for achieving them will become apparent with reference to embodiments described below in detail with the accompanying drawings.

The present invention is not limited to the embodiments disclosed below, but can be implemented in various different forms.

In the present specification, the embodiments are provided to complete the disclosure of the present invention, and to completely inform those skilled in the art to which the present invention belongs of the scope of the invention.

Further, the invention is only defined by the scope of claims.

Accordingly, in some embodiments, well-known components, well-known operations, and well-known techniques will not be specifically described to avoid obscuring the present invention.

Throughout the specification, the same reference numerals refer to the same components, and terms referred to in the specification are used for the purpose of describing the embodiments and are not intended to limit the present invention.

In the specification, the singular also includes the plural unless otherwise stated, and components and operations referred to by 'comprising, including or having' do not exclude the presence or addition of one or more other components and operations.

Unless otherwise defined, all terms (including technical and scientific terms) used herein may be used with meanings commonly understood by those skilled in the art to which the present invention belongs.

Further, terms defined in common dictionaries are not to be interpreted ideally or excessively unless otherwise stated.

Hereinafter, preferred embodiments of the present invention will be described with reference to the accompanying drawings.

Figure 1:
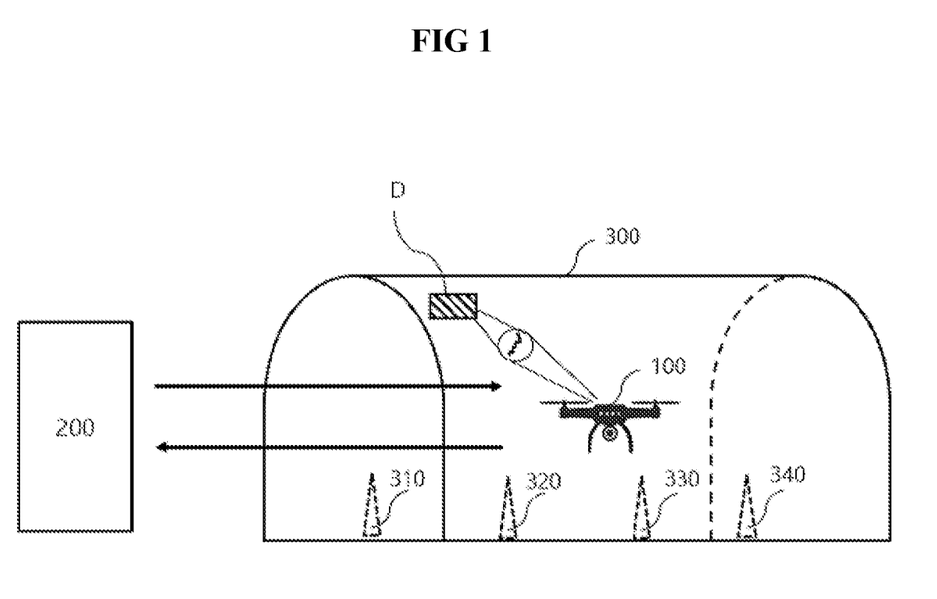
FIG. 1 is a diagram for schematically illustrating an operation of a system that maintains a tunnel using tunnel image data according to an embodiment of the present invention.

FIG. 1 is a diagram for schematically illustrating an operation of a system that maintains a tunnel using tunnel image data according to an embodiment of the present invention.

According to the system of the present embodiment, an appearance of a tunnel 300 is imaged using a drone 100, the captured image data is analyzed to find a part requiring maintenance of the tunnel 300 and a maintenance solution, to thereby quickly calculate an estimate necessary for tunnel maintenance.

To this end, the system according to the present embodiment includes the drone 100, an artificial intelligence tunnel maintenance apparatus 200, and position signal generating apparatuses 310, 320, 330, and 340 that generate position signals for determining position information of the drone in the tunnel.

Since a GPS (Global Positioning System) signal is not received inside the tunnel 300, the position information of the drone cannot be determined using the GPS signal.

Accordingly, in the present embodiment, the plurality of position signal generating apparatuses 310, 320, 330, 340 that generate position signals for determining the position information of the drone are provided inside the tunnel 300, and a setting of capable of determining the position of the drone is performed using the position signals that are respectively generated by the position signal generating apparatuses 310, 320, 330, and 340.

After the setting of determining the position of the drone 100 inside the tunnel, the drone 100 photographs the tunnel 300 under the control of the artificial intelligence tunnel maintenance apparatus 200 to generate tunnel image data and transmits the result to the artificial intelligence tunnel maintenance apparatus 200.

The artificial intelligence tunnel maintenance apparatus 200 analyzes the tunnel image data received from the drone 100 through big data analysis and artificial intelligence to find a part of the tunnel that requires maintenance, and calculates an optimal maintenance solution and an optimal maintenance estimate necessary for the tunnel maintenance.

The artificial intelligence tunnel maintenance apparatus 200 divides the tunnel into a plurality of photographing areas using tunnel data and existing tunnel image data, and photographs the plurality of photographing areas to create tunnel image data on the corresponding areas.

Here, the existing tunnel image data refers to primary tunnel image data and secondary tunnel image data stored in a DB 220. That is, in order to distinguish tunnel image data (primary tunnel image data and secondary tunnel image data) that is currently newly created through the drone 100 from previous tunnel image data (primary tunnel image data and secondary tunnel image data) stored in the DB 220, the primary tunnel image data and the secondary tunnel image data stored in the DB 220 will be referred to as the existing tunnel image data.

Here, in a case where the tunnel image data (the primary tunnel image data and the secondary tunnel image data) that is currently newly created through the drone 100 is stored in the DB 220, the existing tunnel image data is updated.

The artificial intelligence tunnel maintenance apparatus 200 may analyze image data on the plurality of photographing areas using artificial intelligence and big data to find a part D that requires maintenance, and may create precise image data on cracks of the part through artificial intelligence.

Further, the artificial intelligence tunnel maintenance apparatus 200 may calculate a maintenance solution and a maintenance estimate for the part D requiring maintenance through artificial intelligence analysis using the precise image data on the cracks.

Figure 2:
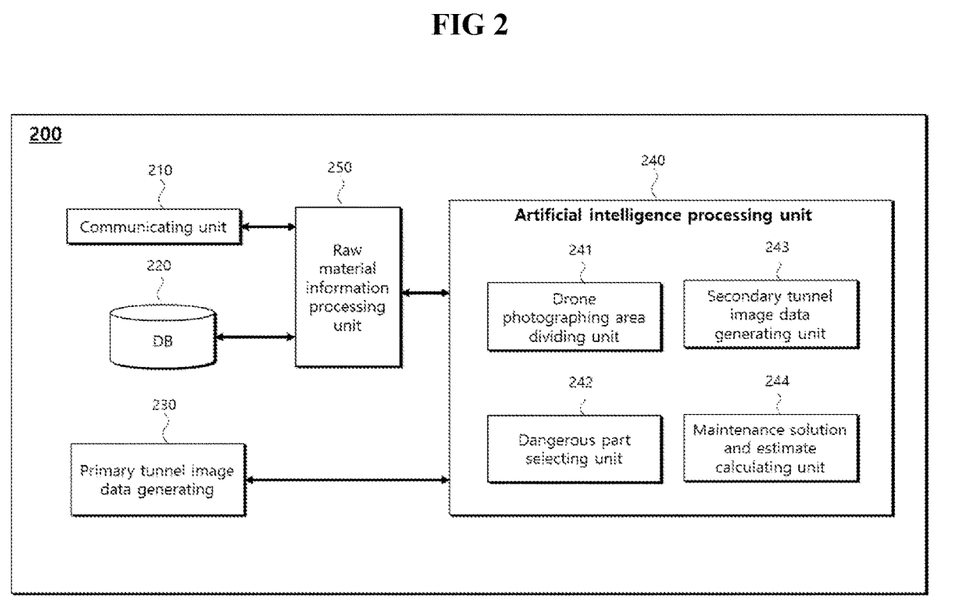
FIG. 2 is a diagram showing a configuration of an artificial intelligence tunnel maintenance apparatus according to an embodiment of the present invention.

FIG. 2 is a diagram showing a configuration of an artificial intelligence tunnel maintenance apparatus according to an embodiment of the present invention.

The artificial intelligence tunnel maintenance apparatus 200 of the present embodiment may include a communicating unit 210, a DB 220, a primary tunnel image data generating unit 230, an artificial intelligence processing unit 240, and a raw material information processing unit 250.

The communicating unit 210 performs communication with the drone 100 to receive the tunnel image data and transmit a drone control signal.

In addition, the communicating unit 210 may receive the position signals from the position signal generating apparatuses 310, 320, 330, and 340.

Further, the communicating unit 210 may communicate with each supplier server to receive information on raw materials necessary for the maintenance of the tunnel.

Further, the communicating unit 210 may access the Internet to receive information on desired raw materials.

In addition, the communicating unit 210 may receive traffic information about vehicles moving through the tunnel by accessing a server that provides traffic information.

The DB 220 stores tunnel data and tunnel image data.

Here, the tunnel data includes a tunnel type, a tunnel construction method, tunnel design drawings, natural environments in which the tunnel is located, and the like.

The tunnel image data refers to the tunnel image data (including primary tunnel image data and secondary tunnel image data) image-captured by the drone 100 for the same tunnel.

Here, the primary tunnel image data refers to image data on a part of the tunnel that is determined to need maintenance, and includes a photographing route and photographing information of the drone when the corresponding data is generated.

The photographing route of the drone refers to route information of the drone for generating the primary tunnel image data. For example, the route information of the drone includes position information of the drone according to the movement of the drone for generating the existing primary tunnel image data (position information of the drone in the tunnel using the position signals received from the position signal generating apparatuses), information on position changes of the drone by lapse of time, speed information of the drone, and the like.

The photographing information includes information on time, date, wind speed, weather when the primary tunnel image data is generated, information on a distance between the drone and a concerned part of the tunnel when the primary tunnel image data is generated, and the like.

The reason why the primary tunnel image data includes the drone photographing route and the photographing information when generating the primary tunnel image data will be described in detail with reference to FIG. 3.

The secondary tunnel image data refers to image data corresponding to a part where a crack of the tunnel actually occurs, including corrected image information for the crack. Further, the DB 220 may store the received raw material information and the traffic volume information of the tunnel.

The primary tunnel image data generating unit 230 controls the drone 100 under the control of the artificial intelligence processing unit 240 to perform drone photographing to generate primary tunnel image data for the corresponding area.

Further, the primary tunnel image data generating unit 230 performs a setting for determining the position of the drone inside the tunnel using the position signals of the position signal generating apparatuses 310, 320, 330, and 340, and controls the drone 100 through the setting.

The artificial intelligence processing unit 240 may analyze the tunnel data and the tunnel image data through big data and artificial intelligence to divide the tunnel into drone photographing areas.

The artificial intelligence processing unit 240 may analyze the primary tunnel image data to select a dangerous part that requires intensive photographing for tunnel maintenance.

The artificial intelligence processing unit 240 may control the drone 100 to perform precise drone photographing for the dangerous part to generate secondary tunnel image data including corrected features for cracks.

The artificial intelligence processing unit 240 may analyze the secondary tunnel image data to calculate a maintenance solution and a maintenance estimate for the tunnel.

Here, the artificial intelligence processing unit 240 may include a drone photographing area dividing unit 241, a dangerous part selecting unit 242, a secondary tunnel image data generating unit 243, and a maintenance solution and estimate calculating unit 244, in order to perform the above-described operation in more detail.

The drone photographing area dividing unit 241 may determine structural features of the tunnel using at least one of the tunnel data and the tunnel image data to divide the tunnel into the drone photographing areas according to priority.

The dangerous part selecting unit 242 may analyze the primary tunnel image data through a dangerous part selecting artificial intelligence method to select a dangerous part that requires intensive photographing for tunnel maintenance.

The secondary tunnel image data generating unit 243 may perform precise drone photographing for the dangerous part through a precise crack photographing artificial intelligence method to generate secondary tunnel image data including corrected features for cracks.

The maintenance solution and estimate calculating unit 244 may analyze the secondary tunnel image data using a tunnel maintenance artificial intelligence method to calculate a maintenance solution and a maintenance estimate for the dangerous part.

The raw material information processing unit 250 processes information on raw materials necessary for tunnel maintenance.

That is, the raw material information processing unit 250 may control the communicating unit 210 to communicate with each supplier server, request the supplier server of the information on the raw materials necessary for the tunnel maintenance, and receive the information from the corresponding supplier.

Further, the raw material information processing unit 250 may search for a new supplier rather than an existing supplier through the Internet for necessary raw material information.

The raw material information processing unit 250 periodically receives the raw material information, updates and stores the information in the DB 220.

Further, in a case where the artificial intelligence processing unit 240 calculates the tunnel maintenance estimate using the tunnel maintenance artificial intelligence method, the raw material information processing unit 250 may search for necessary optimal raw material information from among the raw material information stored in the DB 220.

Further, in a case where the price of a specific raw material increases abnormally, the raw material information processing unit 250 may search for an alternative raw material and store the result in the DB 220.

The dangerous part selecting artificial intelligence method, the precise crack photographing artificial intelligence method, and the tunnel maintenance artificial intelligence method will be described later with reference to FIG. 3.

Figure 3:
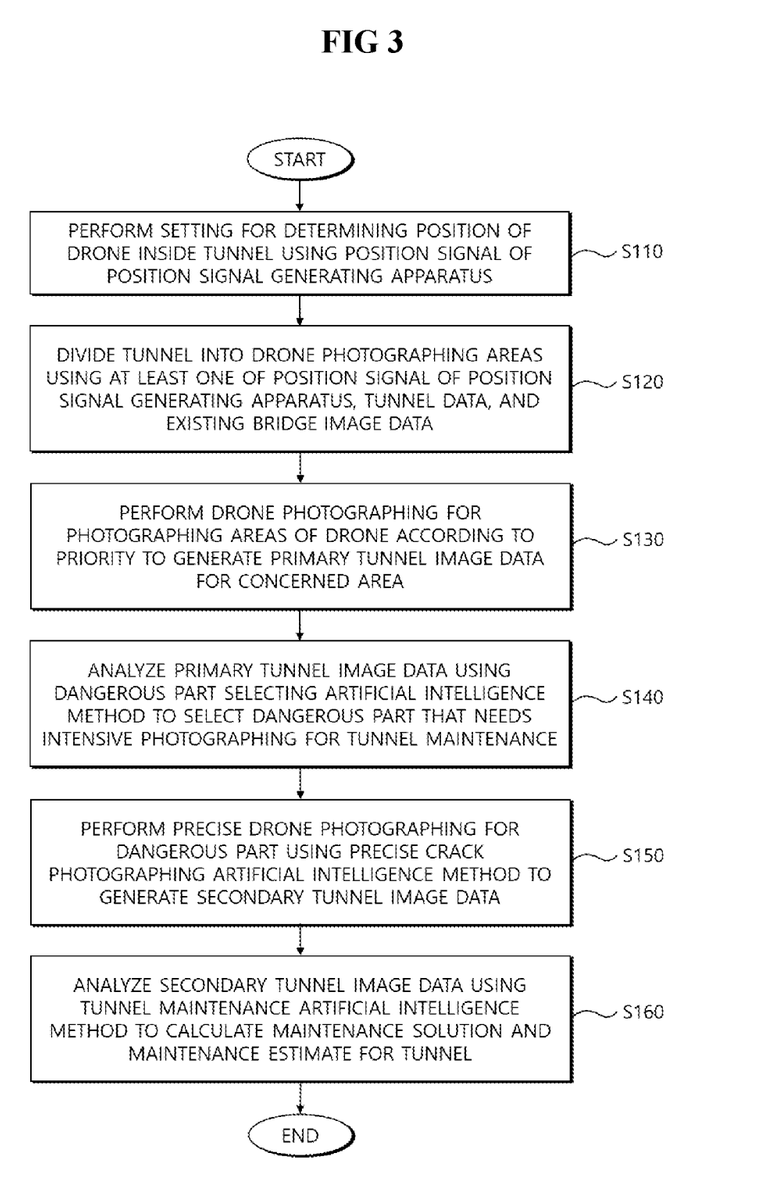
FIG. 3 is a diagram for illustrating a method for calculating a tunnel maintenance solution and a tunnel maintenance estimate using tunnel image data according to an embodiment of the present invention.

FIG. 3 is a diagram for illustrating a method for calculating a tunnel maintenance solution and a tunnel maintenance estimate using tunnel image data according to an embodiment of the present invention.

Step S110 is a step of performing a setting for determining the position of the drone inside the tunnel using the position signals of the position signal generating apparatuses 310, 320, 330, and 340.

Step S120 is a step of dividing the tunnel into drone photographing areas using at least one of position signals of the position signal generating apparatuses 310, 320, 330, and 340, tunnel data, and existing tunnel image data.

The artificial intelligence tunnel maintenance apparatus 200 of the present embodiment may divide the tunnel into the drone photographing areas using at least one of the tunnel data (tunnel type, tunnel construction method, tunnel design drawings, natural environments in which the tunnel is located, and the like) and the existing tunnel image data.

Even in a case where the same or similar cracks occur in the tunnel, the meaning or importance thereof may differ depending on areas where the cracks occur, due to structural functions of the tunnel.

Accordingly, in the present embodiment, the tunnel 300 may be divided into a plurality of drone photographing areas using at least one of the tunnel data (tunnel type, tunnel construction method, tunnel design drawings, natural environments in which the tunnel is located, and the like) and the existing bridge image data.

Further, as described above, since the position of the drone is determined using the position signals of the position signal generating apparatuses 310, 320, 330, and 340 in the tunnel, a signal for controlling the drone 100 may vary according to the sizes of the position signals of the position signal generating apparatuses 310, 320, 330, and 340, and accordingly, in order to optimally control the route of the drone, the drone photographing areas may be divided with reference to positions where the position signal generating apparatuses 310, 320, 330, and 340 are provided.

This will be described in more detail with reference to FIG. 4.

Step S130 is a step of performing drone photographing for the drone photographing areas according to the priority to generate primary tunnel image data for the corresponding areas.

After dividing the tunnel into the drone photographing areas in step S120, the priority may be given according to the drone photographing areas.

Here, the priority is given in the order of importance of areas for tunnel maintenance by analyzing the tunnel data.

For example, in a case where a part where cracks have previously occurred in the tunnel 300 is re-photographed, the priority is given to a part where the crack has occurred in the longitudinal direction of the tunnel rather than the width direction thereof, and the drone photographing is preferentially performed for the part where the crack has occurred in the longitudinal direction.

Here, the primary tunnel image data may include a drone photographing route and photographing information in a case where the primary tunnel image data is generated.

The reason why the primary tunnel image data includes the drone photographing route and the photographing information when generating the the primary tunnel image data is as follows.

In comparing the existing primary tunnel image data with the currently photographed primary tunnel image data, by performing drone photographing under the same or similar conditions as in generating the existing primary tunnel image data, it is possible to quickly and easily find out a changed part (for example, the number, sizes, directions, or the like of cracks) in the existing primary tunnel image data without significantly correcting the currently photographed primary tunnel image data. That is, it is possible to quickly find out a changed part in the image data without additionally performing a complicated image operation process.

Step S130 is a step of analyzing the primary tunnel image data through a dangerous part selecting artificial intelligence method to select a dangerous part that requires intensive photographing for tunnel maintenance.

The dangerous part selecting artificial intelligence method employs a CNN (Convolution Neural Network) method that optimally changes a filter and a channel according to features to be compared between the primary tunnel image data and the existing tunnel image data (that is, the existing primary tunnel image data) to select a part of the tunnel 300 in which a change of at least one of the shape, color, and features of cracks in the primary tunnel image data is equal to or greater than a reference range compared to the existing tunnel image data as a dangerous part.

For example, in a case where the shape, color, and cracks are changed by 20% or more compared to the existing data with reference to the shape, color, and features of cracks of the existing primary tunnel image data, it is possible to select the corresponding part as a dangerous part.

The CNN (Convolutional Neural Network) method is used as a representative artificial intelligence method for image analysis.

In a case where artificial intelligence uses CNN to recognize pictures of cats or dogs, for example, an element that needs learning is a filter.

The artificial intelligence composes a weight set capable of properly recognizing features of a picture by continuously correcting the weights while comparing a value concluded by a current filter through scanning with a correct answer.

The artificial intelligence that recognizes the cat pictures will have a filter with features of cats as the learning progresses. Accordingly, filters with features such as pointed ears, straight pupils, and long tails of cats are made and used.

In a case where these filters scan an image of a cat and find a region with the corresponding features, the probability that this image corresponds to a cat is set high.

In consideration of these features, in the present embodiment, an optimal filter may be selected in advance according to a main image of the existing primary tunnel image data, and filter correction may be corrected so that an image comparison operation can be performed in a short time using the selected filter.

Further, in a case where color is not very important in comparative analysis of the primary tunnel image data (for example, in a case where only the size and shape of a crack are considered), an image comparison operation speed can be properly improved by using only one channel.

The dangerous part selecting artificial intelligence method of the present embodiment analyzes the photographing route of the drone included in the primary tunnel image data stored in the DB, and finds out position information of the drone (GPS coordinate information of the drone) according to movement of the drone when generating the existing primary tunnel image data, information on position changes of the drone by lapse of time, speed information of the drone, and the like.

Further, the dangerous part selecting artificial intelligence method of the present embodiment analyzes the photographing information included in the primary tunnel image data stored in the DB, and finds out information on time, date, wind speed, and weather when generating the existing primary tunnel image data, information on the distance between the drone and a concerned point of the tunnel when generating the primary tunnel image data, and the like.

Then, the dangerous part selecting artificial intelligence method of the present embodiment generates primary tunnel image data by controlling the drone according to the same or similar photographing route of the drone.

That is, the drone is controlled to be the same as the route and speed including the existing movement position of the drone to generate the primary tunnel image data.

Here, for more accurate comparison and analysis of image data, the dangerous part selecting artificial intelligence method of the present embodiment may additionally correct and generate the primary tunnel image data in accordance with the photographing information including the information on time, date, wind speed, and brightness when generating the existing primary tunnel image data, the information on the distance between the drone and the concerned point of the tunnel when generating the primary tunnel image data, and the like.

For example, in a case where the time, date, wind speed and brightness information in the tunnel when generating the existing primary tunnel image data, and the distance between the drone and the concerned point in the tunnel when generating the primary tunnel image data become different, even if the same object is photographed at the same position, images may be expressed differently due to changes of season and weather, influence of wind in the tunnel, a difference in brightness of lighting, and a distance difference. Accordingly, in the present embodiment, in consideration of the above point, errors due to the changes of season and weather, the influence of wind in the tunnel, the difference in the brightness of lighting, and the distance difference are corrected so that images can be expressed under the same conditions, so that the photographing is performed to generate the primary bridge image data under the same conditions as in generating the existing primary bridge image data.

Then, using the above-described CNN method, in a case where the change of at least one of the shape, color, and features of cracks in the primary tunnel image data is equal to or greater than the reference range compared to the existing tunnel image data, it is possible to select the part of the corresponding image data as a dangerous part.

According to these features of the present embodiment, by performing drone photographing under the same or similar drone photographing route conditions as in generating the existing primary tunnel image data, it is possible to quickly and easily find out changed parts (the number, sizes, directions, or the like of cracks) in the existing primary tunnel image data without significantly correcting the currently photographed primary tunnel image data.

Further, by additionally correcting the existing primary tunnel image data according to the generated photographing information to generate primary tunnel image data, it is possible to accurately compare and analyze the existing primary tunnel image data with the primary tunnel image data.

Step S150 is a step of performing precise drone photographing for the dangerous part using the precise crack photographing artificial intelligence method to generate secondary tunnel image data.

The dangerous part is a part where a damaged part of the tunnel is equal to or greater than the reference range compared to the existing tunnel inspection, which means a part that preferentially requires maintenance for the safety of the tunnel.

Accordingly, the precise drone photographing is additionally performed for the dangerous part to generate second tunnel image data including corrected image information for cracks.

The precise crack photographing artificial intelligence method is a method for determining the width, length, and depth of a crack by correcting a photographing route, a photographing position, and a photographing distance of a drone through big data analysis and artificial intelligence analysis.

Since information on cracks identical to or very similar to real cracks is necessary for the dangerous part, the precise crack photographing artificial intelligence method is performed to remove factors that may cause errors during drone photographing.

That is, the existence of actual cracks may not be detected according to the photographing route, the photographing position, and the photographing distance of the drone, and in this case, image information that is different from image information for the actual cracks may be acquired.

Accordingly, in the present embodiment, by removing and correcting the errors that may occur during drone photographing using the precise crack photographing artificial intelligence method, it is possible to generate secondary tunnel image data having realistic crack information.

The secondary tunnel image data includes corrected image information on cracks, and thus, includes precise features of cracks that are identical to or very similar to actual cracks.

Step S160 is a step of analyzing the secondary tunnel image data using the tunnel maintenance artificial intelligence method to calculate a maintenance solution and a maintenance estimate for the tunnel.

The tunnel maintenance artificial intelligence method is a method for determining an optimal maintenance solution using a tunnel design, a construction method, construction materials, and features of cracks of a part where the cracks occur, in the secondary tunnel image data, and calculating an optimal maintenance estimate using the same.

For example, the tunnel maintenance artificial intelligence method may determine whether a crack of the tunnel is a structural crack or a surface crack that occurs during construction or use, and then, may determine a maintenance solution and a maintenance estimate in consideration of the depth or size of the crack.

In the present embodiment, by analyzing each piece of secondary tunnel image data through big data and artificial intelligence, it is possible to determine a maintenance solution and a maintenance estimate for a concerned part, and then, it is possible to calculate a maintenance estimate for the overall tunnel in consideration of parts of the tunnel that requires maintenance as a whole.

Here, even in the case of the same type of tunnels, maintenance methods may be different according to traffic volumes, and maintenance methods may be different between a tunnel built in a place where a wind speed is high and a tunnel built in a place where the wind speed is not high.

Accordingly, the tunnel maintenance artificial intelligence method of the present embodiment can determine an optimal maintenance solution in consideration of natural environments where the tunnel is built.

Further, even in the case of the same type of tunnels, maintenance time points and methods may be different between a place with a high traffic volume and a place with a low traffic volume. Accordingly, the tunnel maintenance artificial intelligence method of the present embodiment can analyze the traffic volume of the tunnel to differently determine the maintenance time point and the maintenance method in further consideration of the traffic volume.

Further, the tunnel maintenance artificial intelligence method of the present embodiment may calculate a maintenance estimate using raw material information necessary for the tunnel maintenance.

In recent years, the price of raw materials has rapidly increased, and the cost of raw materials has become an important factor at the construction site. Accordingly, proper management of raw material procurement and the purchase cost has become an important part of the maintenance cost.

Accordingly, the raw material information processing unit 250 of the artificial intelligence tunnel maintenance apparatus 200 of the present embodiment periodically receives the raw material information necessary for the maintenance of the tunnel from raw material suppliers, or searches for the raw material information on the market through the Internet to update and store the result in the DB 220.

Then, in a case where the tunnel maintenance is necessary, the maintenance artificial intelligence method may search for respective raw material suppliers that supply necessary raw materials so that the maintenance cost is minimized and the maintenance effect is maximized, and may calculate and provide a raw material purchasing method such that the cost of raw materials can be minimized from combination of the respective suppliers.

Further, in a case where the price of a specific raw material abnormally increases, the maintenance artificial intelligence method may search for a substitute raw material for the specific raw material to recommend the substitute raw material for the maintenance.

Figure 4:
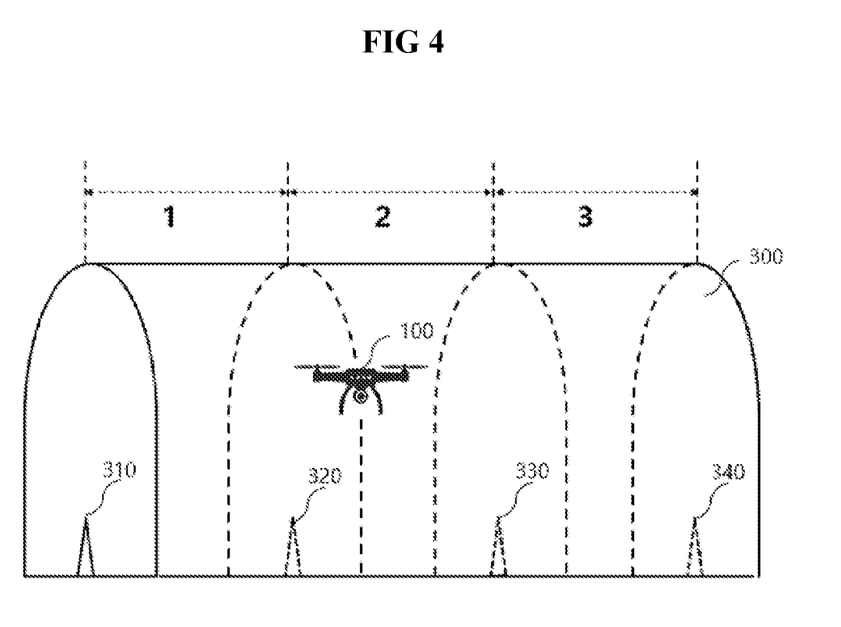
FIG. 4 is a diagram illustrating a method for determining a position of a drone inside a tunnel and a method for dividing a tunnel into drone photographing areas according to an embodiment of the present invention.

FIG. 4 is a diagram illustrating a method for determining a position of a drone inside a tunnel and a method for dividing a tunnel into drone photographing areas according to an embodiment of the present invention.

In the present embodiment, the plurality of position signal generating apparatuses 310, 320, 330, and 340 are provided inside the tunnel 300, and the position of the drone 100 is determined by using the position signals generated by the position signal generating apparatuses 310, 320, 330, and 340.

In this case, an error may occur in the position of the drone 100 depending on the sizes of the position signals of the position signal generating apparatuses 310, 320, 330, 340 to be used.

Accordingly, in order to reduce the error in determining the position of the drone, the tunnel is divided into a plurality of areas according to the sizes of the position signals of the position signal generating apparatuses 310, 320, 330, and 340, and the position of the drone is determined by using one or more signals having a large position signal in a concerned area.

In FIG. 4, an example in which the four position signal generating apparatuses 310, 320, 330, and 340 are used and three spaces are divided between the respective position signal generating apparatuses 310, 320, 330, and 340 to determine the position of the drone 10 is shown.

Here, the artificial intelligence tunnel maintenance apparatus 200 of the present embodiment may more minutely divide the tunnel into the drone photographing areas additionally using at least one of the tunnel data (tunnel type, tunnel construction method, tunnel design drawings, natural environments in which the tunnel is located, and the like) and the existing tunnel image data.

As described above, by dividing the tunnel into the drone photographing areas and determining the priority of the respective areas using at least one of the tunnel data (tunnel type, tunnel construction method, tunnel design drawings, natural environments in which the tunnel is located, and the like) and the existing tunnel image data, it is possible to perform precise and effective drone photographing for a part that requires maintenance according to the priority.

Figure 5:
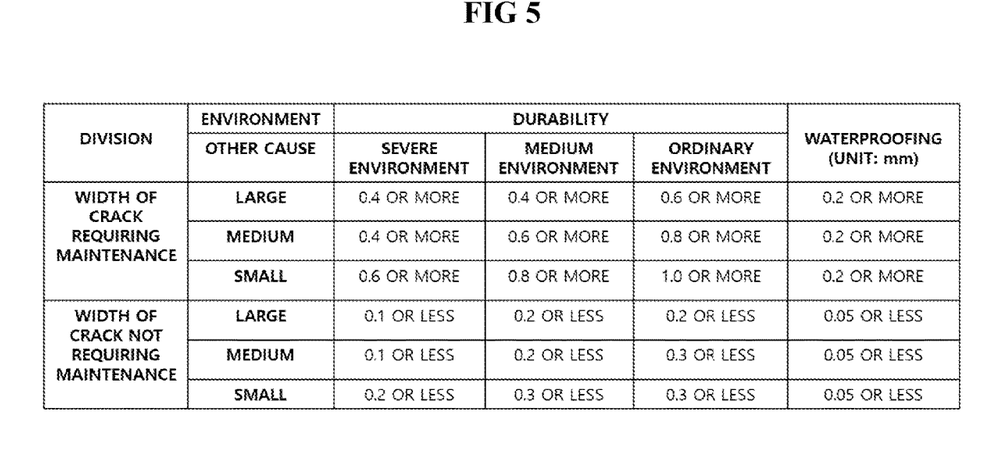
FIG. 5 is a diagram for illustrating a criterion for maintaining a tunnel according to features of cracks according to an embodiment of the present invention.

FIG. 5 is a diagram for illustrating a criterion for maintaining a tunnel according to features of cracks according to an embodiment of the present invention.

In a case where a crack occurs on a surface of a concrete structure such as a tunnel or a tunnel, the size and penetration of the crack are the most important factors for maintenance.

For example, since leakage of water of an amount proportional to the cube of the size of the crack occurs, if the crack is left without maintenance, the crack becomes larger due to the leakage.

To solve this problem, according to the present embodiment, by dividing and analyzing a crack that requires maintenance and a crack that does not require maintenance according to environmental factors that affect a concrete structure, it is possible to determine which crack requires maintenance.

Here, the environments mainly refer to environments that affect rust generating conditions of rebar, and the degree of harmfulness that affects durability and waterproofing of the concrete structure may be divided into large, medium, and small, which are decided by combination of effects of the depth and shape of a crack, the presence or absence of surface coating of the concrete structure, a coating thickness, material composition, splicing, and the like.

Figure 6:
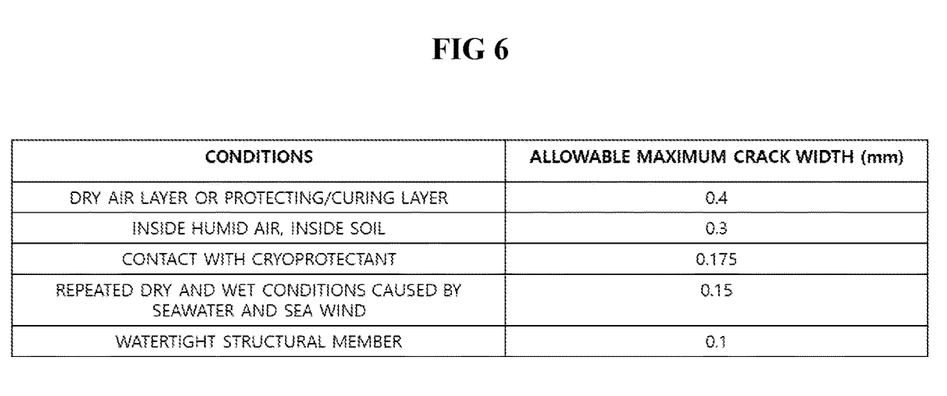
FIG. 6 is a diagram for illustrating a criterion for allowable cracks due to environmental factors according to an embodiment of the present invention.

FIG. 6 is a diagram for illustrating a criterion for allowable cracks due to environmental factors according to an embodiment of the present invention.

In a place where cracks in a concrete structure such as a tunnel or tunnel occur, rebar and concrete are separated from each other, and corrosion expands to neighboring areas from an area where the separation occurs, which leads to more severe separation due to rust expansion pressure to further progress the corrosion.

Accordingly, an allowable crack width for durability of a concrete structure may be set as shown in FIG. 6 according to environments that affect the occurrence of rust, as a criterion for maintenance.

The present invention is not limited to the specific preferred embodiments described above, and various modifications will be possible without departing from the essential features of the present invention by those skilled in the art to which the present invention belongs, and it is obvious that variations are within the scope of claims.

Explanation of References

100: Drone
200: Artificial intelligence tunnel maintenance apparatus
210: Communicating unit
220: DB
230: Primary tunnel image data generating unit
240: Artificial intelligence processing unit
241: Drone photographing area dividing unit
242: Dangerous part selecting unit
243: Secondary tunnel image data generating unit 244: Maintenance solution and estimate calculating unit
250: Raw material information processing unit
300: Tunnel
310,320,330,340: Position signal generating apparatus

What is claimed is:

1. A system for maintaining a tunnel by analyzing tunnel image data received from a drone using artificial intelligence, comprising:
the drone that photographs a tunnel to generate the tunnel image data;
a position signal generating apparatus that is provided inside the tunnel and generates a position signal for determining position information of the drone in the tunnel; and
an artificial intelligence tunnel maintenance apparatus that finds a part of the tunnel that requires maintenance, and calculates an optimal maintenance solution and an optimal maintenance estimate necessary for the tunnel maintenance,
wherein the artificial intelligence tunnel maintenance apparatus includes:
a communicating unit that communicates with the drone to receive the tunnel image data and transmits a drone control signal;
a DB that stores tunnel data and the tunnel image data;
a primary tunnel image data generating unit that controls the drone under the control of an artificial intelligence processing unit to perform drone photographing to generate primary tunnel image data for a concerned area of the tunnel; and
the artificial intelligence processing unit that analyzes the tunnel data and the tunnel image data through big data and artificial intelligence to divide the tunnel into drone photographing areas, analyzes the primary tunnel image data to select a dangerous part that requires intensive photographing for the tunnel maintenance, performs precise drone photographing for the dangerous part to generate secondary tunnel image data including corrected features for cracks, and analyzes the secondary tunnel image data to calculate a maintenance solution and a maintenance estimate for the tunnel.

2. The system according to claim 1,
wherein the artificial intelligence processing unit includes:
a drone photographing area dividing unit that determines structural features of the tunnel using at least one of the tunnel data and the tunnel image data to divide the tunnel into the drone photographing areas according to priority;
a dangerous part selecting unit that analyzes the primary tunnel image data through a dangerous part selecting artificial intelligence method to select the dangerous part that requires the intensive photographing for the tunnel maintenance;
a secondary tunnel image data generating unit that performs the precise drone photographing for the dangerous part through a precise crack photographing artificial intelligence method to generate the secondary tunnel image data including the corrected features for the cracks; and
a maintenance solution and estimate calculating unit that analyzes the secondary tunnel image data using a tunnel maintenance artificial intelligence method to calculate the maintenance solution and the maintenance estimate for the dangerous part.

3. The system according to claim 1,
wherein the drone includes:
a position determining unit that receives the position signal from the position signal generating apparatus and determines a position in the tunnel through the position signal;
an image capturing unit that is provided with at least one of an image capturing apparatus including lighting and an ultrasonic apparatus, and acquires tunnel image data for an inner surface of the tunnel; and
a drone communicating unit that communicates with the artificial intelligence maintenance apparatus.

4. The system according to claim 2, further comprising:
a raw material information processing unit,
wherein the raw material information processing unit controls the communicating unit to communicate with each supplier server with respect to raw material information, periodically receives the raw material information through the Internet, updates and stores the received raw material information in the DB, and searches for the raw material information when necessary, and the maintenance solution and estimate calculating unit calculates a tunnel maintenance solution and a maintenance estimate for maximizing a maintenance effect using the raw material information acquired from the raw material information processing unit.

5. The system according to claim 2, wherein the drone photographing area dividing unit sets a maintenance importance in consideration of a tunnel type, a tunnel construction method, tunnel design drawings, and natural environments in which the tunnel is located, and divides the tunnel into the drone photographing areas according to the maintenance importance.

6. The system according to claim 2,
wherein the dangerous part selecting unit analyzes at least one of a photographing route of the drone and photographing information included in the primary tunnel image data stored in the DB, performs drone photographing to match the photographing route of the drone, performs correction to be the same or similar to the photographing information to generate the primary tunnel image data, and selects a part of the tunnel in which a change of at least one of a shape, color, and features of cracks in the primary tunnel image data is equal to or greater than a reference range as a dangerous part, using a CNN (Convolution Neural Network) method for optimally changing a filter and a channel according to features to be compared between the generated primary tunnel image data and existing tunnel image data.

7. A tunnel maintaining method using tunnel image data in a tunnel maintaining system including a drone and an artificial intelligence tunnel maintenance apparatus, the method comprising:
(a) a step of performing a setting for determining a position of the drone inside the tunnel using a position signal of a position signal generating apparatus, by a tunnel artificial intelligence maintenance apparatus;
(b) a step of dividing a tunnel into drone photographing areas using at least one of the position signal of the position signal generating apparatus, tunnel data stored in a DB, and existing bridge image data, by the artificial intelligence tunnel maintenance apparatus;
(c) a step of performing drone photographing for the photographing areas of the drone according to priority, generating primary tunnel image data for a concerned area including a photographing route of the drone and photographing information, and storing the generated primary tunnel image data in the DB to update the existing tunnel image data, by the artificial intelligence tunnel maintenance apparatus;

(d) a step of analyzing the primary tunnel image data using a dangerous part selecting artificial intelligence method to select a dangerous part that needs intensive photographing for tunnel maintenance, by the artificial intelligence tunnel maintenance apparatus;

(e) a step of performing precise drone photographing for the dangerous part using a precise crack photographing artificial intelligence method, generating secondary tunnel image data including corrected features for cracks, and storing the generated secondary tunnel image data in the DB, by the artificial intelligence tunnel maintenance apparatus; and (f) a step of analyzing the secondary tunnel image data using a tunnel maintenance artificial intelligence method to calculate a maintenance solution and a maintenance estimate for the tunnel, by the artificial intelligence tunnel maintenance apparatus.

8. The method according to claim 7,
wherein the step (b) includes a step of determining the position of the drone in the tunnel using the position signal of the position signal generating apparatus, setting a maintenance importance in consideration of the tunnel data and natural environment conditions in which the tunnel is built, and dividing the tunnel into the drone photographing areas according to the maintenance importance.

9. The method according to claim 7,
wherein the photographing route of the drone includes at least one of position information according to movement of the drone for generating the primary tunnel image data, information on position changes of the drone by lapse of time, and speed information of the drone, the photographing information includes at least one of information on a time, a date, a wind speed and brightness in the tunnel when the primary tunnel image data is generated, and information on a distance between the drone and a concerned part of the tunnel when the primary tunnel image data is generated, and the dangerous part selecting artificial intelligence method analyzes at least one of the photographing route of the drone and the photographing information included in the primary tunnel image data stored in the DB, performs drone photographing to match the photographing route of the drone, performs correction to be the same or similar to the photographing information to generate the primary tunnel image data, and selects a part of the tunnel in which a change of at least one of a shape, color, and features of cracks in the primary tunnel image data is equal to or greater than a reference range as a dangerous part, using a CNN (Convolution Neural Network) method for optimally changing a filter and a channel according to features to be compared between the generated primary tunnel image data and the existing tunnel image data.

10. The method according to claim 7,
wherein the precise crack photographing artificial intelligence method determines a width, length, and depth of a crack by correcting the photographing route, a photographing position, and a photographing distance of the drone.

11. The method according to claim 7,
wherein the tunnel maintenance artificial intelligence method determines an optimal maintenance solution by analyzing a tunnel design, a construction method, construction materials, features of cracks of a part where the cracks occur, and a use situation of the tunnel, in the secondary tunnel image data, and calculates an optimal maintenance estimate using the same.

12. The method according to claim 7,
wherein the tunnel maintenance artificial intelligence method calculates a tunnel maintenance solution and a maintenance estimate for optimizing a cost and a maintenance effect necessary for the tunnel maintenance using raw material information necessary for the tunnel maintenance, acquired through a raw material information processing unit.

* * * * *